(12) United States Patent
Coan et al.

(10) Patent No.: US 6,480,720 B1
(45) Date of Patent: Nov. 12, 2002

(54) METHOD FOR CONTACTING A SUBSCRIBER TO MULTIPLE WIRELESS BEARER SERVICES

(75) Inventors: William Patrick Coan, Monroe, WA (US); Michael Luna, Brentwood, CA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/353,241

(22) Filed: Jul. 14, 1999

(51) Int. Cl.$^7$ .................................................. H04Q 7/20
(52) U.S. Cl. ........................ 455/458; 455/426; 455/552
(58) Field of Search ................................ 455/426, 552, 455/553, 458, 414, 434, 415, 422, 403, 525, 450; 340/2.1, 825.36, 825.4, 825.03, 7.27, 7.45; 370/449

(56) References Cited

U.S. PATENT DOCUMENTS

| | | | | |
|---|---|---|---|---|
| 5,533,094 A | * | 7/1996 | Sanmugam | 340/7.27 |
| 5,638,412 A | * | 6/1997 | Blakeney, II et al. | 375/377 |
| 5,655,003 A | * | 8/1997 | Erving et al. | 379/418 |
| 5,819,184 A | * | 10/1998 | Cashman | 455/553 |
| 5,828,959 A | | 10/1998 | Soderbacka | 455/445 |
| 5,915,214 A | * | 6/1999 | Reece et al. | 379/114.01 |
| 5,924,042 A | * | 7/1999 | Sakamoto et al. | 340/7.27 |
| 5,933,763 A | * | 8/1999 | Wang et al. | 340/7.22 |
| 5,946,619 A | * | 8/1999 | Kolev | 455/432 |
| 5,946,629 A | * | 8/1999 | Sawyer et al. | 455/426 |
| 5,950,128 A | * | 9/1999 | Ghisler | 455/426 |
| 5,966,658 A | * | 10/1999 | Kennedy et al. | 455/426 |
| 6,035,203 A | * | 3/2000 | Hanson | 455/422 |
| 6,108,518 A | * | 8/2000 | Madour et al. | 340/7.25 |
| 6,219,542 B1 | * | 4/2001 | Aas et al. | 455/412 |
| 6,259,892 B1 | * | 7/2001 | Helferich | 340/7.2 |
| 6,268,802 B1 | * | 7/2001 | Foladare et al. | 340/7.2 |
| 6,370,378 B1 | * | 4/2002 | Yahagi | 370/337 |
| 6,370,390 B1 | * | 4/2002 | Salin et al. | 455/426 |

FOREIGN PATENT DOCUMENTS

| | | | | |
|---|---|---|---|---|
| EP | 0851703 A | | 7/1998 | |
| WO | WO98/20695 A | | 5/1998 | |
| WO | 99/31907 | * | 6/1999 | H04Q/7/22 |
| WO | 01/35689 | * | 5/2001 | H04Q/7/38 |

OTHER PUBLICATIONS

European Search Report dated Jul. 11, 2000 regarding European Patent Application No. 00305600.9.

* cited by examiner

*Primary Examiner*—Dwayne Bost
*Assistant Examiner*—Jean A Gelin
(74) *Attorney, Agent, or Firm*—Kenyon & Kenyon

(57) ABSTRACT

The present invention provides a method for contacting a wireless user who subscribes to several bearer services. The wireless user may be active on only a single bearer service at any given time. The present invention discloses a method for contacting the wireless user by sending alert messages over each of the wireless bearer services in turn until the user is contacted.

18 Claims, 2 Drawing Sheets

METHOD FOR CONTACTING A SUBSCRIBER TO MULTIPLE WIRELESS BEARER SERVICES

FIELD OF THE INVENTION

The present invention is directed to a method for contacting a subscriber to several different wireless bearer services at a wireless communicator when the wireless communicator can only be active on one bearer service at a time.

BACKGROUND OF THE INVENTION

As the availability and use of wireless communication services continues to expand and devices have become available that can transmit and receive on several different kinds of wireless networks, it has become commonplace for individual wireless users to subscribe to more than one wireless service for use with a single wireless communicator. These wireless communication bearer services transmit and receive using different formats and methods of transmission. Due to these differences between the bearer services and physical limitations of the wireless communication device itself, the wireless communicator generally can only be active on a single bearer service at any given time. This becomes a problem when a connection or message to the subscriber is desired because it is impossible to know what bearer service to use to reach the subscriber.

One solution to this problem is to have the wireless communication device notify or register with a central server whenever it changes to a different bearer service and that central server can direct any incoming messages or connection requests to use the proper bearer service. This approach has several drawbacks. First, it requires additional functionality in the wireless communicator to provide support for the registration function. It also results in increased network traffic and the need for a channel to be opened between the wireless communicator and central server every time the subscriber changes the bearer service setting on the wireless communicator.

SUMMARY OF THE INVENTION

The present invention provides an improved method for contacting the wireless communicator of a subscriber who uses multiple bearer services. When a message delivery request is received, a first wireless bearer service is selected from the group of bearer services that the subscriber uses, and a delivery is attempted on that bearer service. If no response is received from the wireless communicator after a certain amount of time has elapsed, a second bearer service is selected and a delivery is attempted on that bearer service. The process is repeated until a delivery is successful or until all of the subscriber's bearer services have been attempted without success.

The present invention presents a solution to the problem of contacting a wireless user who subscribes to several bearer services that does not require additional functionality in the communicator or a registration connection every time the subscriber switches bearer services.

DETAILED DESCRIPTION

Figure 1:
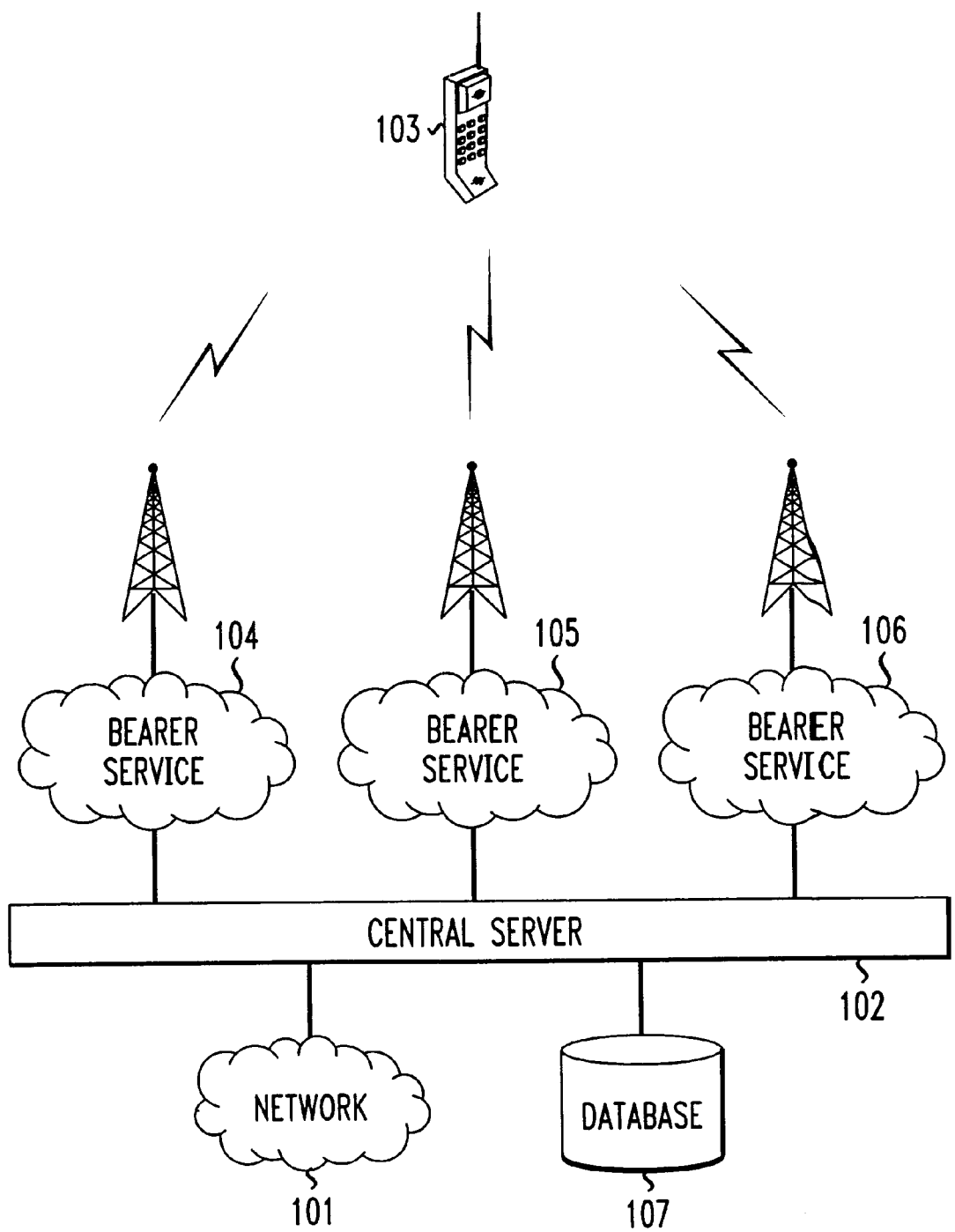
FIG. 1 illustrates a wireless network such as may be used with an embodiment of the present invention.

In an embodiment shown in FIG. 1, the method of the present invention is triggered by receipt at central server 102 of a message delivery request from network 101 to wireless communicator 103. Network 101 could be the Public Switched Telephone Network (PSTN), the Internet, a Private Branch Exchange (PBX), or any other communication network. The message received by central server 102 contains information identifying a particular individual who subscribes to multiple bearer services. Using this identifying information, central server 102 retrieves a list of the subscriber's bearer services from database 107. Bearer service 104 is selected from the list and central server 102 transmits a message delivery request over bearer service 104 to attempt to contact wireless communicator 103. If wireless communicator 103 is active on bearer service 104, it will respond to the message delivery request and central server 102 can complete the desired delivery from network 101. After a certain amount of time elapses with no response from wireless communicator 103, central server 102 will select bearer service 105 from the list and attempt a message delivery over bearer service 105 to wireless communicator 103. If wireless communicator 103 is active on bearer service 105, it will respond to the message delivery request and central server 102 can complete the desired delivery from network 101. If wireless communicator 103 is not active on bearer service 105, after a certain amount of time elapses central server 102 will timeout the attempt and select bearer service 106 from the list. The process of attempting message delivery repeats for each of the bearer services that a user has subscribed to until wireless communicator 103 is successfully contacted or all of the bearer services in the list have been attempted and wireless communicator 103 has failed to respond on any of them.

If all of the attempts fail, then the process may start over with the first bearer service in the list, the message delivery request may be stored to attempt a delivery at a future time, or server 102 can simply notify the requestor that the subscriber is unreachable. The determination of what post-failure procedure to implement may also be dependent on the type of message delivery attempted. For example, a request for an email message or fax may be stored for later transmittal, while a request for an urgent page may be tried continuously, and a request for a voice connection may be routed to a voice mail system. A stored message delivery request could also be sent the next time the subscriber connects to a bearer service in order to place a call.

The message delivery request that is received may take many forms, such as a paging message to be transmitted to the subscriber, a computer generated information message such as a stock quote or a sports score, a message indicating an update to the subscriber's schedule, contact list/address book or other Personal Information Manager (PIM) information, an email message, a fax, or a request for a voice connection.

The order in which the bearer services are tried may be customized. The present invention can be implemented such that the bearer services are always attempted in a particular order based on the subscriber's or service provider's preferences. Alternatively, a message delivery could be first attempted on the bearer service that the subscriber was most recently successfully contacted on. Another alternative implementation would track the success rate of message delivery attempts on the various bearer services and attempt message delivery on the bearer services in an order based on this previous success rate. For example, if the subscriber was reached 60% of the time on bearer A, 10% of the time on bearer B, and 30% of the time on bearer C, the order in which the bearer services would be attempted would be A, C, B.

The bearer services could include any digital or analog method used to communicate with wireless devices including Cellular Digital Packet Data (CDPD), IS-130/135, and Generic UDP Transport Service (GUTS) over IS-136. The bearer services could also be satellite or ground based.

The wireless communicator is not limited to cellular telephones, but may be any wireless communication device including pagers, Personal Digital Assistants (PDA), and portable computing devices.

Figure 2:
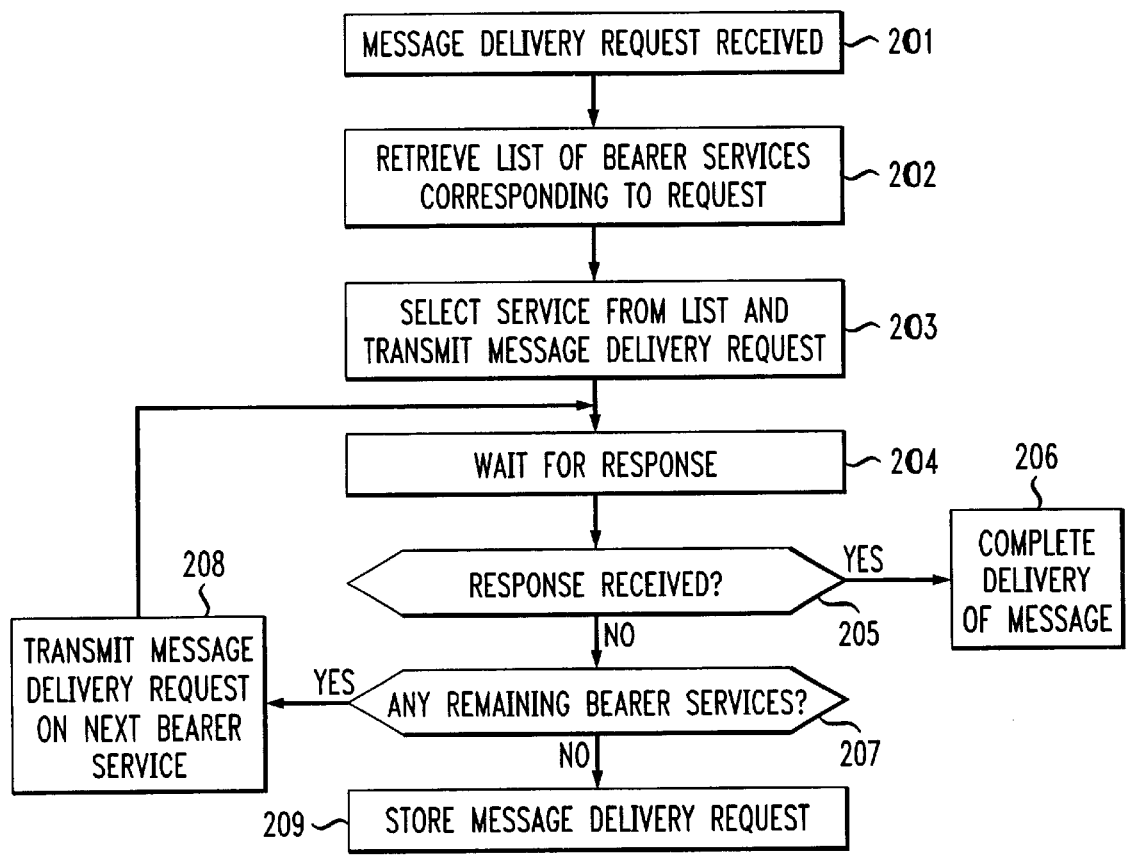
FIG. 2 is a flowchart illustrating one possible implementation of the method of the present invention.

FIG. 2 is a flow chart illustrating one possible implementation of the method of the present invention. A message delivery request that contains information identifying the subscriber or wireless device to be contacted is received by a server providing the service of the present invention (step 201). The server uses the identifying information in the request to retrieve a corresponding list of bearer services from a database (step 202). The server then selects the first bearer service from the list and transmits a message delivery request via that bearer service (step 203). The server then waits a predetermined amount of time for a response to the message delivery request (step 204). If a response is received the server completes the delivery between the original requester and the wireless device (step 205, 206). If no response is received the server then checks to see if a message delivery has been attempted on all the bearer services (step 207). If all the bearer services have been tried then the server stores the message delivery request for transmission later (step 209). If not, then the server transmits a message delivery request on the next bearer service and repeats the process (step 208).

The present invention is not limited to the specific embodiments described. It is expected that those skilled in the art will be able to devise other implementations that embody the principles of the present invention and remain within its scope.

What is claimed is:

1. A method for contacting a subscriber at a wireless communicator capable of selecting between a plurality of wireless communication bearer services, comprising:
    a. selecting a first wireless communication bearer service from said plurality of wireless communication bearer services;
    b. sending a notification message to said wireless communicator via said selected wireless communication bearer service;
    c. waiting a predetermined amount of time for a response from said wireless communicator indicating that said notification message was received;
    d. if said predetermined amount of time elapses before a response is received:
        i. selecting a wireless communication bearer service from the remaining unselected wireless communication bearer services of said plurality of wireless communication bearer services; and
        ii. repeating steps b through d.

2. The method of claim 1 wherein said plurality of wireless communication bearer services includes at least one analog bearer service.

3. The method of claim 1 wherein said plurality of wireless communication bearer services includes at least one digital bearer service.

4. The method of claim 1 wherein said plurality of wireless communication bearer services includes at least one voice bearer service.

5. The method of claim 1 wherein said plurality of wireless communication bearer services includes at least one data bearer service.

6. The method of claim 1 wherein said first wireless communication bearer service is the wireless bearer service on which said subscriber was most recently successfully contacted.

7. The method of claim 1 wherein the order in which said wireless communication bearer services are selected is predetermined by said subscriber.

8. The method of claim 1 wherein the order in which said wireless communication bearer services are selected is predetermined by the provider of the service.

9. The method of claim 1 wherein the order in which said wireless communication bearer services are selected is based on the prior rate of success in contacting said subscriber for each bearer service.

10. A method for contacting a subscriber at a wireless communicator capable of selecting between a plurality of wireless communication bearer services, comprising:
    selecting a first wireless communication bearer service from said plurality of wireless communication bearer services;
    repeating the following steps until a response is received from said wireless communicator or until a connection has been attempted on each of said plurality of wireless communication bearer services:
        i. sending a notification message to said wireless communicator via said selected wireless communication bearer service;
        ii. waiting a predetermined amount of time for a response from said wireless communicator indicating that said notification message was received; and
        iii. if said predetermined amount of time elapses before a response is received, selecting a wireless communication bearer service from the remaining unselected wireless communication bearer services of said plurality of wireless communication bearer services.

11. The method of claim 10 further comprising:
    if no response is received from said wireless communicator on any of said plurality of bearer services, storing a request to attempt to contact said wireless communicator at a future time.

12. The method of claim 10 further comprising:
    if no response is received from said wireless communicator on any of said plurality of bearer services, repeating said selecting and said repeating steps.

13. The method of claim 10 wherein said plurality of wireless communication bearer services includes at least one analog bearer service.

14. The method of claim 10 wherein said plurality of wireless communication bearer services includes at least one digital bearer service.

15. The method of claim 10 wherein said first wireless communication bearer service is the wireless bearer service on which said subscriber was most recently successfully contacted.

16. The method of claim 10 wherein the order in which said wireless communication bearer services are selected is predetermined by said subscriber.

17. The method of claim 10 wherein the order in which said wireless communication bearer services are selected is predetermined by the provider of the service.

18. The method of claim 10 wherein the order in which said wireless communication bearer services are selected is based on the prior rate of success in contacting said subscriber for each bearer service.

* * * * *